April 26, 1960 A. ZVEJNIEKS 2,934,328
METHOD AND AN APPARATUS FOR CALCINING OF GYPSUM
Filed April 18, 1957
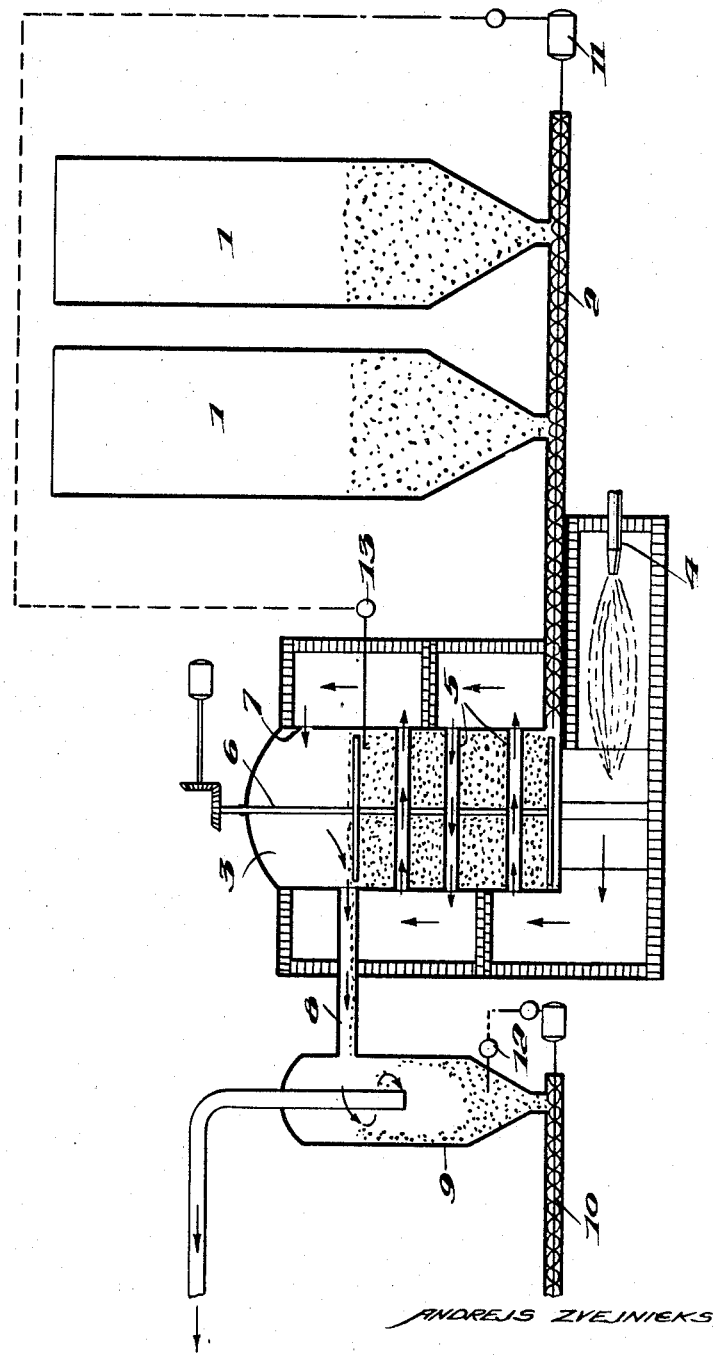
INVENTOR
ANDREJS ZVEJNIEKS,
BY Pierce, Scheffler & Parker
his ATTORNEYS

United States Patent Office 2,934,328
Patented Apr. 26, 1960

2,934,328

METHOD AND AN APPARATUS FOR CALCINING OF GYPSUM

Andrejs Zvejnieks, Kankakee, Ill.

Application April 18, 1957, Serial No. 653,597

6 Claims. (Cl. 263—21)

This invention relates to a method and an apparatus for calcining gypsum.

It is known in the art to calcine gypsum for manufacturing plaster, moulding plaster or gypsum-wallboard, by heating powdered gypsum batchwise in large externally heated kettles. The kettles are provided with mechanically operated agitators and heat is transferred to the center of the mass of gypsum by means of heating flues, extending transversely through the kettles. Attempts have been made to make the kettle process continuous but investigators in this field have found that the calcined gypsum or stucco from continuous kettles used to be undercalcined and needed some after calcination in a connecting apparatus. Calcining directly with flue gases in rotary calciners or kiln mills give a stucco which is not suitable for said manufacturing purposes owing to overcalining of one part of the gypsum. The cause of said overcalcining is believed to be the high temperature to which gypsum particles are exposed in their direct contact with flue gases.

I have found that a uniformly calcined gypsum of high quality is obtained from a continuous kettle process when the gypsum is fed in at a point near bottom of the kettle and the temperature of the stucco withdrawn from a point near the top of the kettle is raised and/or the water vapor from the calcining reaction diluted with combustion gases by contacting said combustion gases directly with gypsum and water vapor in the kettle.

Also an object of this invention is a continuous method for calcining gypsum, where a mixture of water vapor and partly dehydrated gypsum formed at calcining in a kettle reactor is contacted directly with combustion gases of desirable temperature so that a part of the heat for calcining is supplied by direct heat exchange between gypsum, water vapor and said combustion gases.

Another object of the invention is to provide a continuous apparatus for calcining gypsum containing means for feeding in gypsum at the bottom of a kettle reactor, means for maintaining the gypsum in said reactor in fluidized state and at calcining conditions, means for moving the gypsum upwards in said reactor, means for contacting the gypsum with combustion gases and means for withdrawing the mixture of calcined gypsum, water vapor and combustion gases at a point near the top of the reactor.

In the forthcoming an embodiment of the continuous calcinating kettle according to the invention will be described with reference to the attached drawing, showing diagrammatic illustration of the continuous calcining kettle in sectional side elevation.

According to Fig. 1, gypsum is fed continuously from hopper 1 through screw conveyor 2 in at the bottom of the calcining kettle 3. The kettle is heated in known manner for instance with burner 4, the combustion gases circulating through flues 5 which extend transversely through the kettle. Gypsum in the kettle is stirred slowly with the agitator 6, maintained in a fluidized state with the water vapor which is generated by the calcining reaction and moved upwardly in the kettle by feeding in more gypsum with the screw conveyer 2. During its way upwards the gypsum is calcined. Near the top of the kettle this calcined gypsum and the water vapor in the kettle are contacted with combustion gases led in at 7. The combustion gases at this moment have a temperature higher than the temperature of said calcined gypsum and water vapors in the kettle, therefore the temperature in the kettle is raised and the partial pressure of water vapor lowered. The calcined gypsum mixed with said combustion gases and water vapor is withdrawn through the connection 8 leading to a cyclone 9 where the calcined gypsum is separated from the gases, and withdrawn with screw conveyor 10. This screw conveyer is connected and regulated with a level control device 12. The feed rate is regulated automatically with motor 11 connected to, and actuated by, impulses from temperature control device 13.

I would state in conclusion that while the above description discloses an embodiment of my invention, I do not wish to limit myself precisely to these details since manifestly the same can be considerably varied without departing from the spirit of the invention as defined in the appended claims.

What I claim is:

1. An apparatus for calcining gypsum, comprising a continuous externally heated kettle type reactor with means for feeding in gypsum at the bottom of said reactor, means for producing hot combustion gas of desirable temperature, means for contacting the gypsum directly with said hot combustion gas in the upper part of the same reactor, means for maintaining the gypsum in fluidized state in said reactor, means for withdrawing the calcined gypsum in mixture with hot water vapor and combustion gas at the top of the reactor and means for separating the calcined gypsum from the hot gas.

2. An apparatus as claimed in claim 1 in which the means for production of the hot gas of desirable temperature comprises a combustion chamber and heating flues extending transversely through the kettle.

3. An apparatus for calcining gypsum as claimed in claim 1 in which the means for feeding in gypsum comprises a screw conveyer and means for automatic regulation of the feed rate governed from a temperature control device, said temperature control device being located at a point near the top of said reactor.

4. An apparatus as claimed in claim 1 in which the means for separating the calcined gypsum from the hot gas comprises a cyclone separator provided with a gas outlet and a screw conveyer for withdrawing the separated calcined gypsum and means for automatical controlling of the withdrawing rate of calcined gypsum, said controlling means being governed from a level control device located in said cyclone separator.

5. Continuous process of calcining gypsum in a closed reaction chamber, which comprises the following continuously practiced sequence of steps: introducing pulverized raw gypsum into the chamber at a point adjacent the bottom of the latter; burning a combustible material in air to produce hot combustion gases; heating the pulverized raw gypsum to calcining temperature and partially calcining the same with release of water vapor by passing said hot combustion gases in indirect heat exchange relationship with said pulverized gypsum; maintaining the resulting mixture of partially calcined gypsum and water vapor in fluidized state in an upward moving column; thereafter directly contacting the hot combustion gases with the upper part of said column; and removing essentially the whole amount of the resulting mixture of calcined gypsum, water vapor and combustion gases from said column at a point adjacent the top of the latter.

6. Continuous process of calcining gypsum, as defined in claim 5, in which calcined gypsum is separated from the withdrawn mixture of calcined gypsum, water vapor and hot combustion gases before substantial cooling takes place.

References Cited in the file of this patent

UNITED STATES PATENTS

| | | |
|---|---|---|
| 519,259 | Higginson | May 1, 1894 |
| 624,709 | Van Hook | May 9, 1899 |
| 1,746,294 | Tyler | Feb. 11, 1930 |
| 2,529,366 | Bauer | Nov. 7, 1950 |
| 2,776,725 | Wood | Jan. 8, 1957 |